United States Patent
Spira et al.

(10) Patent No.: US 11,643,196 B1
(45) Date of Patent: May 9, 2023

(54) TEETERING PROPULSOR ASSEMBLY OF AN ELECTRIC VERTICAL TAKEOFF AND LANDING AIRCRAFT

(71) Applicant: BETA AIR, LLC, South Burlington, VT (US)

(72) Inventors: Daniel Spira, South Burlington, VT (US); Kyle Brookes, South Burlington, VT (US); David Churchill, South Burlington, VT (US); Mark Page, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/852,229

(22) Filed: Jun. 28, 2022

(51) Int. Cl.
*B64C 27/54* (2006.01)
*B64C 27/43* (2006.01)

(52) U.S. Cl.
CPC ............ *B64C 27/54* (2013.01); *B64C 27/43* (2013.01)

(58) Field of Classification Search
CPC .......... B64C 27/43; B64C 27/41; B64C 27/37
See application file for complete search history.

(56) References Cited

U.S. PATENT DOCUMENTS

| | | | | |
|---|---|---|---|---|
| 3,288,226 A * | 11/1966 | Lemont, Jr. | ............. | B64C 27/43 416/102 |
| 3,370,809 A * | 2/1968 | Leoni | ...................... | B64C 27/54 244/7 R |
| 4,092,084 A * | 5/1978 | Barltrop | .................. | B64C 27/43 416/102 |
| 6,082,968 A * | 7/2000 | Nyhus | ..................... | B64C 27/43 416/107 |
| 8,985,951 B2 * | 3/2015 | Rauber | ................... | B64C 27/43 416/141 |
| 11,104,415 B2 * | 8/2021 | Judas | ...................... | B64C 27/43 |

FOREIGN PATENT DOCUMENTS

DE 102009012903 A1 * 9/2010 ............. B64C 27/43

* cited by examiner

*Primary Examiner* — Richard Green
(74) *Attorney, Agent, or Firm* — Caldwell Intellectual Property Law

(57) ABSTRACT

An electric vertical takeoff and landing aircraft including a teetering propulsor assembly is provided. Teetering propulsor assembly may include a propeller that includes a hub and blades. Hub of propeller may be mechanically connected to a teeter mechanism of propulsor assembly that may be configured to allow the propeller to pivot about a teeter axis relative to the electric aircraft. Thus, teeter mechanism allows for a rotational axis of propeller to move during teetering of propeller. Teeter mechanism may include one or more springs that reduce teetering or prevent teetering of the propulsor at certain rotational speeds of propeller.

20 Claims, 5 Drawing Sheets

TEETERING PROPULSOR ASSEMBLY OF AN ELECTRIC VERTICAL TAKEOFF AND LANDING AIRCRAFT

FIELD OF THE INVENTION

The present invention generally relates to the field of aircraft propulsors. In particular, the present invention is directed to a teetering propulsor assembly of an electric vertical takeoff and landing aircraft.

BACKGROUND

Edgewise flight can cause non-axial strain on rotors and corresponding drive systems of an aircraft. Such strain results in expediated aging and wear of drive systems.

SUMMARY OF THE DISCLOSURE

In an aspect of the present disclosure, an electric vertical takeoff and landing (eVTOL) aircraft including a teetering propulsor assembly is provided. The electric vertical take-off and landing aircraft may include a motor, a propeller driven by the motor, and a teeter mechanism connected to the propeller. The teeter mechanism may include a base rotatably affixed to the electric vertical takeoff and landing aircraft and configured to rotate about a rotational axis and a hinge connecting the base and the propeller and configured to allow the propeller to pivot about a pivot point of the hinge.

In an aspect of the present disclosure, a teeter mechanism for a propulsor assembly of an electric vertical takeoff and landing aircraft is provided. The teeter mechanism may include a base mechanically connected to a propeller of an electric vertical takeoff and landing aircraft, a hinge extending from the base, the hinge comprising an aperture, and a rod having a longitudinal axis, wherein the rod traverses through the aperture of the hinge and a portion of the propeller to create a pivot point at the hinge between the base and the propeller allowing propeller to pivot about the longitudinal axis of the rod so that a rotation plane of the propeller moves relative to the base.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an electric vertical takeoff and landing aircraft teetering propulsor assembly. In an embodiment, the propulsor assembly includes a hub mechanically connected to a motor, for example by way of a gearbox, shaft, or drivetrain, wherein the hub is configured to rotate about a rotational axis. A teeter mechanism is connected to the hub, wherein the teeter mechanism is configured to permit a propeller to pivot about one or more pivot points of teeter mechanism. Thus, teeter mechanism allows for a rotational axis of propeller to move. The propulsor assembly may include one or more springs, such as, for example, opposing springs, which prevent the propeller from teetering or limit teetering of propeller at certain rotational speeds. Exemplary embodiments illustrating aspects of the present disclosure are described below in the context of several specific examples.

For purposes of description in this disclosure, the terms "up", "down", "forward", "horizontal", "left", "right", "above", "below", "beneath", and derivatives thereof shall relate to the invention as oriented in FIG. 4. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed in this disclosure are not to be considered as limiting, unless the claims expressly state otherwise.

Figure 1:
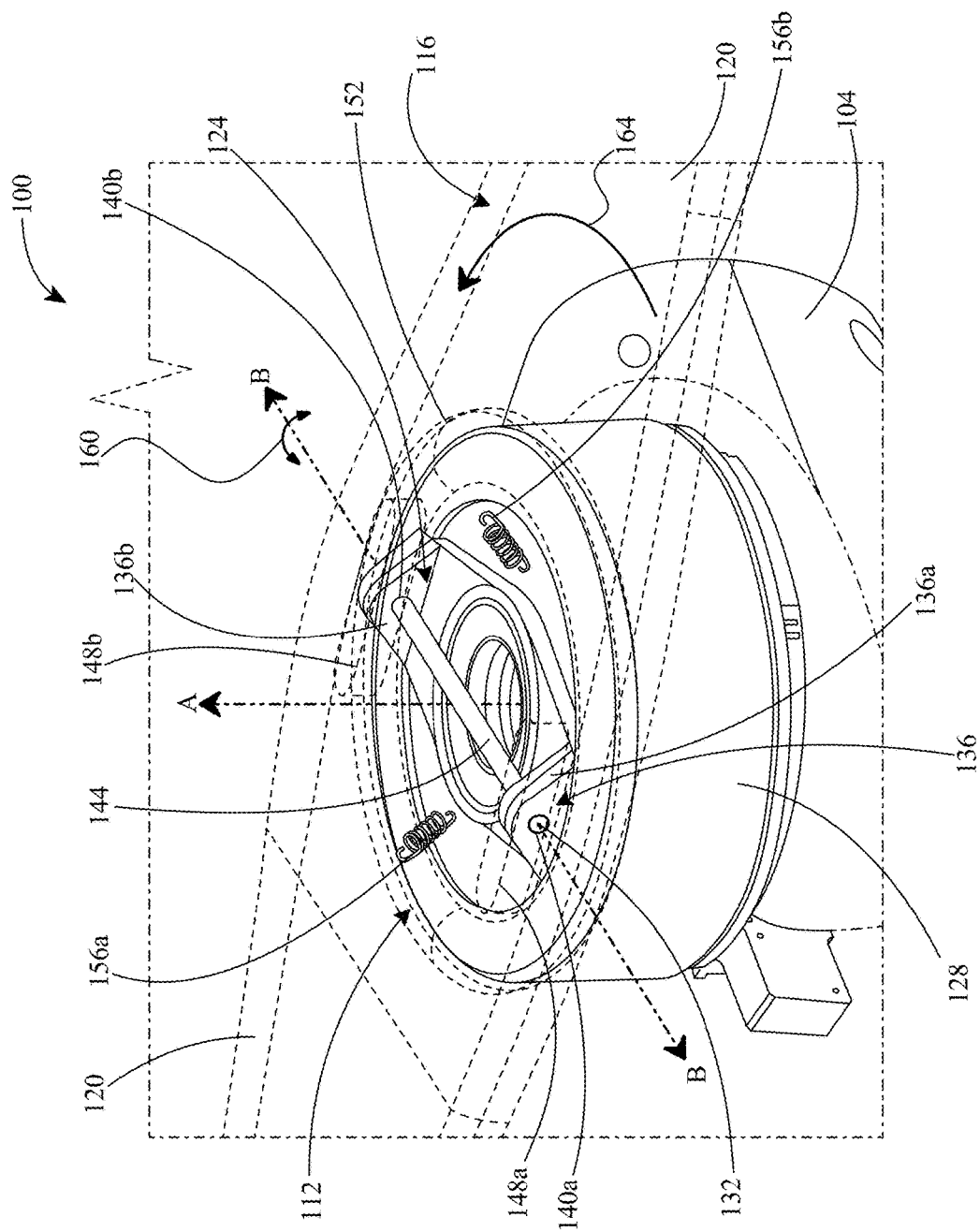
FIG. 1 is a schematic diagram illustrating an exemplary teetering propulsor assembly of an electric aircraft in accordance with one or more embodiments of the present disclosure.

Now referring to FIG. 1, an exemplary embodiment of a teetering propulsor assembly 100 of an electric aircraft 104 is illustrated. Electric aircraft 104 (also referred to herein as an "aircraft") may include an electrical vertical takeoff and landing (eVTOL) aircraft (as shown in FIG. 4), unmanned aerial vehicles (UAVs), drones, rotorcraft, commercial aircraft, and/or the like. Aircraft 104 may include one or more components that generate lift, including, without limitation, wings, airfoils, rotors, propellers, jet engines, or the like, or any other component or feature that an aircraft may use for mobility during flight. Aircraft 104 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generates lift and propulsion by way of one or more powered propulsors connected to a motor, such as a quadcopter, multi-rotor helicopter, or other vehicle that maintains its lift primarily using propulsors that produce an upward thrust force by imparting downward velocity to the surrounding fluid. "Fixed-wing flight," as described in this disclosure, is where the aircraft is capable of flight using wings and/or foils that generate lift caused by the aircraft's forward airspeed and the shape of the wings and/or foils, such as airplane-style flight.

In one or more embodiments, teetering propulsor assembly 100 (also referred to in this disclosure as a "propulsor assembly" or "propulsor") includes a propeller 116. Propeller 116 may include one or more blades 120 that radially extend from a hub 112 of propeller 116. For example, and without limitation, propeller 116 may include a plurality of blades 120, where each blade 120 may extend from hub 112 in an opposite direction from another blade 120. In some embodiments, propeller 116 may include a monolithic component, where blades 120 and hub 112 are a singular unit (shown in FIGS. 1 and 2A-2B). For example, and without limitation, propeller may include a rigid, monolithic component. In other embodiments, propeller 116 may include multiple components, where blades 120 and hub 112 are assembled components that are fixedly and/or moveably attached. In one or more embodiments, hub 112 may be pivotably attached to a base 128 of propulsor assembly 100. Base 128 may be rotatably affixed to electric vertical takeoff and landing aircraft 104 and configured to rotate about, for example, rotational axis A. Base 128, or at least a component of base 128, may rotate about axis A. Base 128 may be mechanically connected to a motor of propulsor assembly 100, either directly or indirectly, so that propulsor 116 may be driven by motor (shown in FIG. 3). In other embodiments, base 128 may include a motor and/or rotor of electric aircraft. In various embodiments, base 128 may be attached to or include a gearbox that translates mechanical movement from motor to propeller 116 so that propeller 116 may rotate about rotational axis A of propeller 116.

Figure 3:
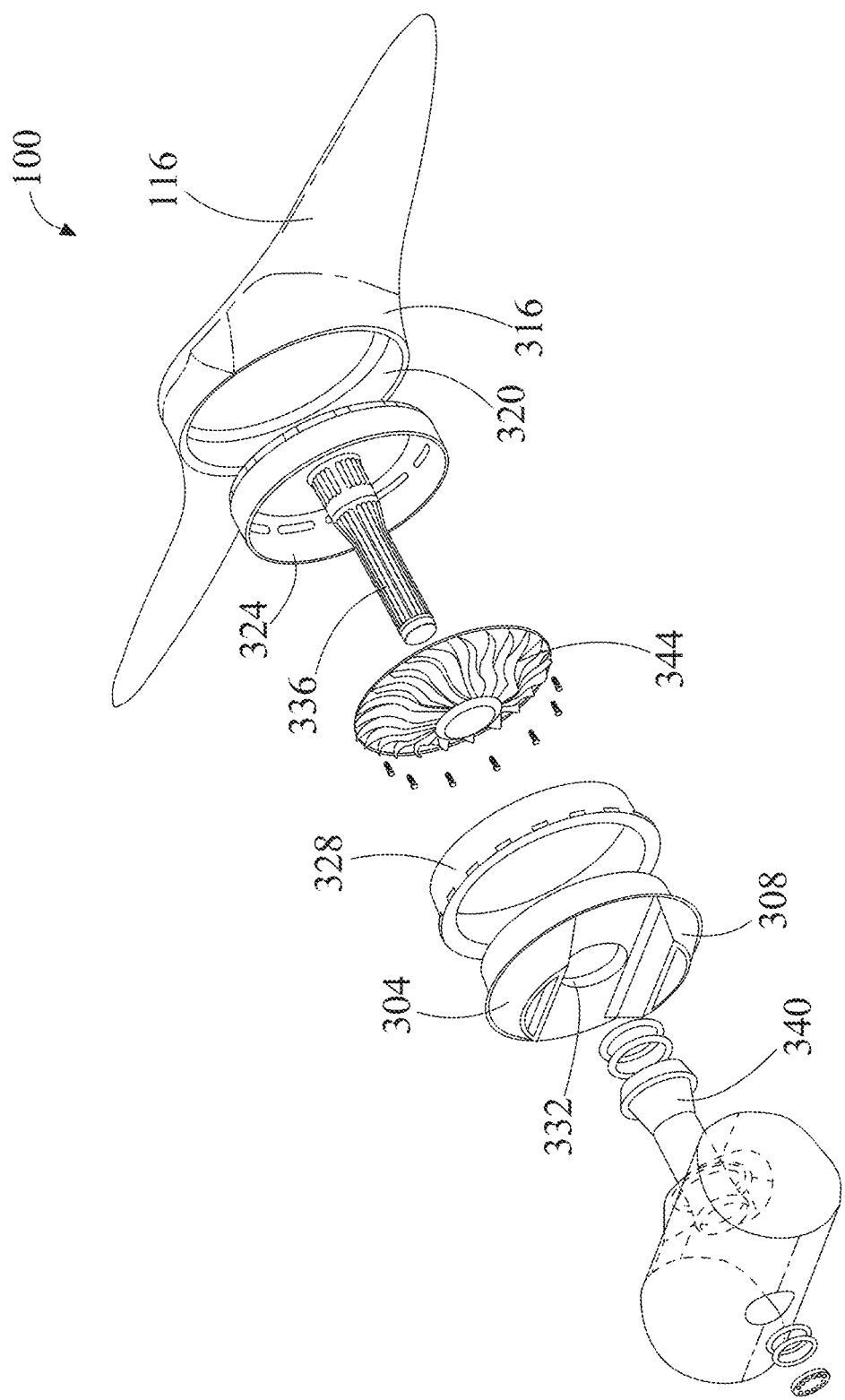
FIG. 3 is an exploded view of an exemplary propulsor assembly incorporated in an electric aircraft in accordance with one or more embodiments of the present disclosure.

In one or more embodiments, motor may be configured to power propeller 116. Motor may include a rotor, stator, motor shaft, and the like, as shown in FIG. 3. Motor may be at least partially disposed in an airframe of aircraft 104, such as a boom or a wing of aircraft 104. Propulsor assembly 100 may include motor, which translates electrical power from a power source of aircraft 104 into a mechanical movement of propeller 116. Rotor of motor may rotate about a central axis of motor.

As used in this disclosure, a "motor" is a device, such as an electric motor, that converts electrical energy into mechanical movement. Motor may include an electric motor. Electric motor may be driven by direct current (DC) electric power. As an example, and without limitation, electric motor may include a brushed DC electric motor or the like. An electric motor may be, without limitation, driven by electric power having varying or reversing voltage levels, such as alternating current (AC) power as produced by an alternating current generator and/or inverter, or otherwise varying power, such as produced by a switching power source. Electric motor may include, for example and without limitation, brushless DC electric motors, permanent magnet synchronous an electric motor, switched reluctance motors, induction motors, and the like. In addition to an inverter and/or a switching power source, a circuit driving electric motor may include electronic speed controllers (not shown) or other components for regulating motor speed, rotation direction, and/or dynamic braking. Motor may be used in an electric vehicle such as an electric automobile and an electric aircraft, including an electrical vertical takeoff and landing (eVTOL) aircraft, a commercial aircraft, an unmanned aerial vehicle, a rotorcraft, and the like. Motor may include the exemplary embodiment of propulsor assembly 100 discussed in reference to FIG. 3. Hub 112 of propeller 116 may be mechanically connected to rotor, directly or indirectly. For example, and without limitation, hub 112 may be connected to a motor shaft that is rotated by rotor. In some embodiments, motor may include a direct drive motor, wherein one rotation of rotor also causes one rotation of hub 112 and/or propeller 116. In other embodiments, motor may include an indirect drive motor where, for example, a gearbox, pulleys, bearing, and/or various other components facilitate movement of propeller 116 by motor. Propulsor assembly components may be consistent with disclosure of propulsor assembly components in U.S. patent application Ser. No. 17/563,498 filed on Dec. 28, 2021 and titled "AN ELECTRIC AIRCRAFT LIFT MOTOR WITH AIR COOLING", in U.S. patent application Ser. No. 17/732,791 filed on Apr. 29, 2022 and titled "MAGNETIC LOCKING SYSTEM OF AN ELECTRIC AIRCRAFT ROTOR AND METHODS THEREOF", in U.S. patent application Ser. No. 17/702,069 filed on Mar. 23, 2022 and titled "A DUAL-MOTOR PROPULSION ASSEMBLY", in U.S. Pat. App. Ser. No. 17/704,798 filed on Mar. 25, 2022 and titled "ROTOR FOR AN ELECTRIC AIRCRAFT MOTOR", all of which are incorporated by reference herein in their entirety.

Propulsor assembly 100 is used to propel aircraft 104 through a fluid medium by exerting a force on the fluid medium. In one or more non-limiting embodiments, propulsor 100 may include a lift propulsor configured to create lift for aircraft 104. In other non-limiting embodiments, propulsor 100 may include a thrust element, which may be integrated into the propulsor 100. A thrust element may include any device or component that converts the mechanical energy of a motor, for instance in the form of rotational motion of a shaft, into thrust in a fluid medium. For example, a thrust element may include, without limitation, an impeller, a turbine, a pump-jet, a paddle or paddle-based device, and the like. As another non-limiting example, propulsor 100 may include a six-bladed pusher propulsor, such as a six-bladed propeller mounted behind the motor to ensure the drive shaft is in compression. Persons skilled in the art, upon reviewing the entirety of this disclosure, will be aware of various devices that may be used as propulsor assembly 100. In various embodiments, when a propeller of propulsor assembly 100 twists and pulls air behind it, it will, at the same time, push aircraft 104 with a relatively equal amount of force. The more air pulled behind aircraft, the more aircraft is pushed forward. In various embodiments, propeller 116 of propulsor assembly 100 may be substantially rigid and not susceptible to bending during flight.

With continued reference to FIG. 1, propulsor assembly 100 may be a lift propulsor oriented such that a rotation plane C (shown in FIGS. 2A and 2B) of propeller 116 is parallel with a ground supporting aircraft 104 when aircraft 104 is landed. As used in this disclosure, a "rotation plane" (also referred to herein as a "plane of rotation") is a plane in which a propeller rotates. Rotation plane may be relatively orthogonal to an axis of rotation of propeller 116, such as axis A. A circumference of a rotational plane may be defined by a rotational path of a tip of blade 120 of propeller 116. As understood by one skilled in the art, assembly 100 may include various types of pitch-flap couplings, where hinge 136 may be oriented in various positions relative to rotation plane C. For instance, and without limitation, axis B may be at an angle relative to rotation plane C. For example, and without limitation, axis B may be perpendicular to rotation plane C. In another example, and without limitation, axis B may be at a non-perpendicular angle relative to rotation plane C. When there is a substantial force exerted on propulsor 116 that is orthogonal to rotational axis A, such as air resistance during edgewise flight, the force may cause significant stress and strain on propeller 116 and/or propulsor assembly 100. As used in this disclosure, "edgewise flight" is a flight orientation wherein an air stream is substantially directed at an edge of a propeller. Edgewise flight (exaggerated for explanation) may occur when an aircraft is traveling in a direction orthogonal to a rotational axis of a propeller and parallel to a rotation plane of the propeller, causing an air stream to be directed at an edge of the propeller. Edgewise flight may also occur when an aircraft is traveling in a direction in which a component of the velocity of the aircraft is in a direction orthogonal to a rotational axis of a propulsor and parallel to rotation plane. Edgewise flight may cause issues with aircraft 104. For example, edgewise flight may cause excessive flapping of blades 120 during flight including flapping angulation. Thus, edgewise flight may lead to inadvertent displacement of propeller 116 that creates excessive loads on a propulsor assembly and/or components thereof.

Still referring to FIG. 1, assembly 100 includes a teeter mechanism 124 mechanically connected to hub 112 of propeller 116, where teeter mechanism 124 is configured to permit propeller 116 to pivot about a pivot point 132 of teeter mechanism 124 (as indicated by directional arrow 160). Teeter mechanism 124 may allow for deflections of propeller 116 during a transition of flight modes or edgewise flight to reduce the issues discussed above caused by edgewise flight. Teeter mechanism 124 allow a rigid propeller to pivot relative to the rest of propulsor assembly. Teeter mechanism 124 facilitates a certain amount of up-and-down tip, or blade displacement, per rotation of propeller 116 to reduce a load experienced by hub 112 and/or propulsor assembly 100, thus making propulsor assembly 100 more robust, especially against strong winds and dynamic operations of aircraft 104. Teeter mechanism 124 may attach hub 112, and thus propeller 116, to base 128. In some embodiments, base 128 may be fixedly attached to a shaft, such as a motor shaft or a shaft of gearbox, which rotates propeller 116 about rotational axis A when motor is running (as indicated by directional arrow 164). Teeter mechanism 124 may include one or more pivot points 132 so that propeller 116 may teeter about a pivot point. In one or more embodiments, when propeller 116 teeters about pivot point 132, rotation plane of propeller 116 may shift so that an orientation of rotation plane may vary relative to aircraft 104.

In one or more embodiments, teeter mechanism 124 may include a hinge 136 that connects base 128 and hub 112 of propeller 116, where hinge 136 is configured to allow propeller 116 to pivot about a pivot point 132. Hinge 136 may provide pivot point 132 on which propeller 116 may teeter and/or tilt. Hinge 136 may be attached to base 128. As understood by one of ordinary skill in the art, hinge 136 may be various shapes and sizes without altering the spirit or the scope of this disclosure. In some embodiments, hinge 136 may be a circular or semi-circular shape. In some embodiments, hinge 136 may be a triangular shape (as shown). In other embodiments, hinge 136 may include a curved corner extending from base 128 and may form a fulcrum on which propeller 116 may teeter. Hinge 136 may include an aperture 140 through which a rod 144 may be disposed therethrough. Rod 144 may have a longitudinal axis B that propeller 116 may rotate about to teeter. In one or more embodiments, axis B may be parallel to a span, or tip-to-tip, axis of propeller 116. In other embodiments, axis B may not be perpendicular to the span axis of propeller 116. Thus, in some embodiments, Still referring to FIG. 1, in one or more embodiments, hinge 136 may include two opposing hinges, one hinge on either side of axis A and either end of axis B. For instance, and without limitations, hinge 136 may include a pair of hinges, such as a first hinge 136a and a second hinge 136b. Each hinge 136a,b may include an aperture that is disposed therein, such as first aperture 140a and second aperture 140b, respectively. Rod 144 may traverse through each aperture 140a,b. For example, and without limitation, a first end of rod 144 may be disposed within aperture 140a, and a second end of rod 144 may be disposed within aperture 140b. Rod 144 may run through each aperture 140a,b in each hinge 136a,b to connect hub 112 to base 128. In one or more embodiments, rod may be fixedly connected to hub 112. In some embodiments, rod 144 may include an integrated component of hub 112. In other embodiments, rod 144 may include a separate component from hub 112 that may be attached to hub 112. In some embodiments, rod 144 may include two separate rods, where a first rod 144 may run through first aperture 140a of first hinge 136a and attach to hub 112 on either or both sides of first hinge 136a, and a second rod 144 may run through second aperture 140b of second hinge 136b and attach to hub 112 on either or both sides of second hinge 136b. Hub 112 may be attached to base 128 using hinges 136a,b so that if base 128, or at least a portion of base 128, moves (e.g., rotates), hub 112 may be moved in conjunction with base 128.

Still referring to FIG. 1, in one or more embodiments, hub 112 may include one or more recesses 148. Recess 148 may include a cavity or depression in an underside surface of hub 112 and/or propeller that faces base 128. Recess 148 may at least partially receive hinge 136 such that at least a portion of hinge 136, such as curved corner, is disposed within recess 148. In some embodiments, recess 148 may contact hinge 136, such as, for example, a rounded edge of hinge 136. Recess 148 may include a plurality of recesses, such as a recess 148a,b that each hinge 136a,b, respectively, may be disposed at least partially within. In some embodiments, a surface of hinge 136, such as a curved surface, may form a fulcrum against recess 148. In some embodiments, hinge 136 may be spaced from recess 148, and hinge 136 and recess 148 may be separated by a gap. In one or more embodiments, hub 112 may include a track 152 that forms a groove within surface of hub 112 that is facing base 128. Track 152 may provide space between hub 112 and base 128, where at least a portion of base 128 may be received by track 152. Thus, track 152 allows for propeller 116 to rotate and/or teeter without impediment from base 128. A shape of track 152 may be complementary to a shape of base 128. For example, and without limitation, shapes of track 152 may include a dome, half toroid (as shown in FIG. 1), and the like.

Still referring to FIG. 1, in one or more embodiments, teeter mechanism 124 may include one or more centering springs 156. Centering spring 156 (also referred to herein as a "spring") may provide resistance in teetering movement of propeller 116. For example, and without limitation spring 156 may be configured to prevent or reduce teetering of propulsor 116. In some embodiments, centering spring 156 may have a spring constant large enough to prevent propulsor 116 from teetering about longitudinal axis B when the propulsor 116 rotates at a rate of approximately 10 Hertz or less. Centering spring may include a plurality of springs, where at least a first centering spring 156a is on a first side of longitudinal axis B and at least a second centering spring 156b is on a second side of longitudinal axis B. In one or more embodiments, centering spring 156 may be attached to base 128 at a proximal end of spring 156 and centering spring 156 may be attached to hub 112 at a distal end of spring 156. Though spring 156 is shown as a helical spring, as understood by one of skill in the art, spring 156 may be various other types of springs and/or any combination thereof. For example, and without limitation, spring 156 may include a compression spring, extension spring, torsion spring, constant force spring, constant rate spring, progressive rate spring, dual rate spring, linear spring, laminated or leaf spring, coil or helical spring, conical spring, flat spring, machined spring, molded spring, disc or Belleville spring (e.g., single or stacked), wave springs, and the like. Spring 156 may be position at various orientations. For example, and without limitation, a longitudinal axis of spring 156 may be angled relative to a connecting surface of base 128 and/or hub 112. In another example, and without limitation, the longitudinal axis of spring 156 may be orthogonal to a connecting surface of base 128 and/or hub 112. In one or more embodiments, propulsor assembly 100 may include a second motor and a second propeller driven by the second motor. The second propeller may include a second hub, a second plurality of blades extending from the hub, where the second hub is configured to rotate about a second rotational axis, and a second teeter mechanism connected to the second hub. The second teeter mechanism may include a second base rotatably affixed to the electric vertical takeoff and landing aircraft and configured to rotate about the second rotational axis, and a second hinge connecting the base and the hub of the propeller and configured to allow the propeller to pivot about a pivot point relative to the second base.

With continued reference to FIG. 1, assembly 100 may include a locking mechanism (not shown) configured to lock teeter mechanism 124, thereby preventing propeller 116 from teetering about longitudinal axis B. When locking mechanism is engaged, propulsor plane is fixed at an orientation orthogonal to rotational axis A. Locking mechanism may be configured to engage and/or disengage during flight of aircraft 104. For example, and without limitation, locking mechanism may be disengaged when aircraft 104 is performing a vertical takeoff and/or a vertical landing and engaged when the aircraft 104 is in fixed-wing flight. In some embodiments, locking mechanism may include a plurality of springs, where each spring is attached to hub 112 at a first end of the spring and attached to base 128 at a second end of the spring. In some embodiments, locking mechanism may include a spring on either side of longitudinal axis B. Locking mechanism may include a plurality of springs on either side of longitudinal axis B. Springs may have a spring constant large enough to prevent teetering of propeller 116 when propeller 116 rotates ten or fewer revolutions per second. For instance, and without limitation, springs may each have an initial tension that provides an internal force large enough to prevent extension of spring unless a substantial load or external force is applied. For example, and without limitation, springs may have a spring constant that prevent propulsor 116 from teetering on teeter mechanism 124 except during forces caused by a rotation of propulsor 116 during operation of aircraft 104 in edgewise flight. In some embodiments, locking mechanism may include spring 156, where spring 156 may have a spring constant large enough to prevent propulsor 116 from teetering about longitudinal axis B when the propulsor 116 is rotating at a lower speed, such as less than 10 Hertz. In some embodiments, locking mechanism may be engaged or disengaged by an actuator. Actuator may be controlled by a controller, such as a computing device, as discussed further in FIG. 5. Controller may be communicatively connected to actuator and/or locking mechanism. In various embodiments, actuator may be configured to retract to essentially stiffen spring, which may engage locking mechanism. Actuator may be configured to extend to essentially loosen spring, which may disengage locking mechanism. Controller may adjust a position of actuator and alter a maximum rotational speed of propeller 116 in which locking mechanism is engaged and prevents propeller 116 from teetering about longitudinal axis B by an undesirable amount or completely. Controller may be communicatively connected to locking mechanism. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Controller may be configured to engage and/or disengage locking mechanism. For example, controller may disengage locking mechanism to unlock teeter mechanism 124 when aircraft 104 performs a vertical takeoff and engage the locking mechanism, thereby locking teeter mechanism 124, when the aircraft 104 is in fixed-wing flight. Transition between flight modes of an electric aircraft may be consistent with disclosure of U.S. patent application Ser. No. 17/825,371 filed on May 26, 2022 and titled "AN ELECTRIC AIRCRAFT LIFT MOTOR WITH AIR COOLING", "AN APPARATUS FOR GUIDING A TRANSITION BETWEEN FLIGHT MODES OF AN ELECTRIC AIRCRAFT", all of which is incorporated by reference herein in its entirety Controller may include any computing device as described in this disclosure, including without limitation a microcontroller, processor, microprocessor, digital signal processor (DSP), and/or system on a chip (SoC) as described in this disclosure. Computing device may include, be included in, and/or communicate with a mobile device such as a mobile telephone or smartphone. Controller may include a single computing device operating independently, or may include two or more computing device operating in concert, in parallel, sequentially or the like; two or more computing devices may be included together in a single computing device or in two or more computing devices. Controller may interface or communicate with one or more additional devices as described below in further detail via a network interface device. Network interface device may be utilized for connecting controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller may include but is not limited to, for example, a computing device or cluster of computing devices in a first location and a second computing device or cluster of computing devices in a second location. Controller may include one or more computing devices dedicated to data storage, security, distribution of traffic for load balancing, and the like. Controller may distribute one or more computing tasks as described below across a plurality of computing devices of computing device, which may operate in parallel, in series, redundantly, or in any other manner used for distribution of tasks or memory between computing devices. Controller may be implemented using a "shared nothing" architecture in which data is cached at the worker, in an embodiment, this may enable scalability of assembly 100 and/or computing device.

With continued reference to FIG. 1, controller may be designed and/or configured to perform any method, method step, or sequence of method steps in any embodiment described in this disclosure, in any order and with any degree of repetition. For instance, controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2A:
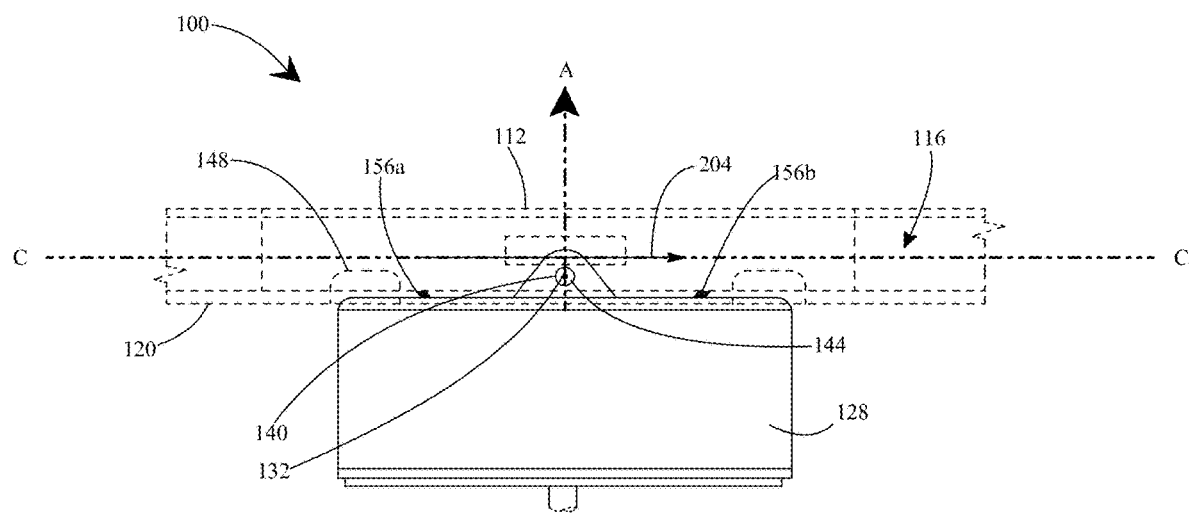
FIGS. 2A-B are a set of schematic diagrams illustrating an exemplary movement of teetering propulsor assembly in accordance with one or more embodiments of the present disclosure.
Figure 2B:
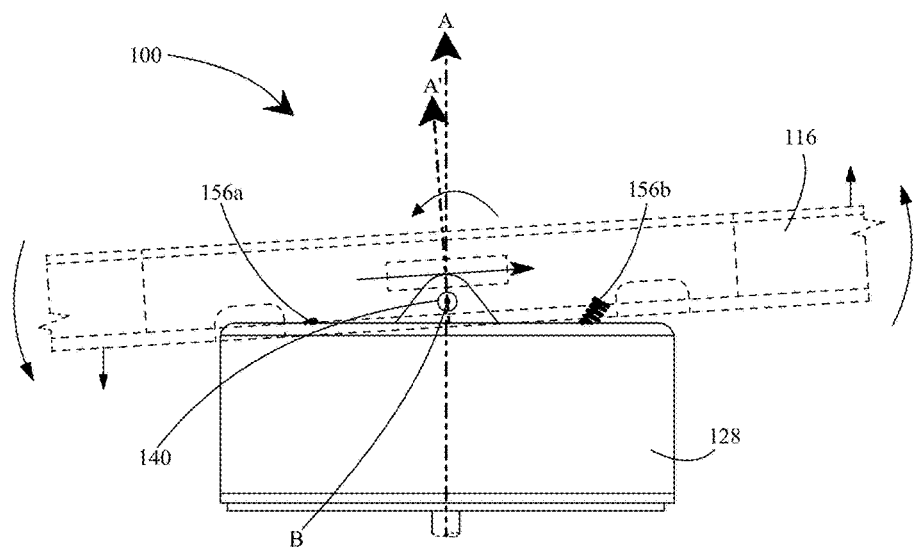

Referring now to FIGS. 2A and 2B, an exemplary movement of teetering propulsor assembly 100 is illustrated. As shown in FIG. 2A, propeller 116 may have a rotational axis A that is in an initial position. In some embodiments, initial position of axis A may be predetermined by a manufacturer or user of aircraft 104. In some embodiments, in initial position, propeller 116 may share a rotational axis with base 128 when propeller is not teetering about axis B. For example, and without limitation, propeller 116 may share a rotational axis with a shaft of base 128, gearbox, or motor that facilitates rotation of propeller 116. When propeller 116 is not teetering, springs 156 may both be in a resting and/or initial position. For example, and without limitation, in a resting position, each spring 156a,b may be of a relatively equal length relative to the other spring 156b,a.

As shown in FIG. 2B, rotational axis of propeller 116 may move to a second position, as indicated by rotational axis A', as propeller 116 teeters and/or tilts relative to aircraft 104. In an exemplary embodiment, propeller 116 may not share a rotational axis with base 128 when propeller 116 is teetering about axis B. For instance, and without limitation, rotational axis A of propeller 116 is not parallel to a rotational axis of base 128. When propeller 116 is teetering, springs 156 may be in a displaced position. For example, and without limitation, in a displaced position, a length of each spring 156a,b may vary relative to the other spring 156b,a. A displaced position of spring 156 may include a position that places spring 156 in tension or compression. In a non-limiting embodiment, during teetering of propeller 116, first spring 156a may compress while second spring 156b may simultaneously extend, which allows propeller 116 to tilt relative to base 128, resulting in deflections of propeller 116 to reduce strain experienced by hub 112 and/or propulsor assembly 100.

Referring now to FIG. 3, an exemplary embodiment of teetering propulsor assembly 100 is illustrated. Assembly 100 may include motor. Motor may include at least a stator 304. Stator 304, as used herein, is a stationary component of a motor and/or motor assembly. In an embodiment, stator 304 may include at least first magnetic element 308. As used herein, first magnetic element 308 is an element that generates a magnetic field. For example, first magnetic element 308 may include one or more magnets which may be assembled in rows along a structural casing component. Further, first magnetic element 308 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element 308 may act to produce or generate a magnetic field to cause other magnetic elements to rotate, as described in further detail below. Stator 304 may include a frame to house components including first magnetic element 308, as well as one or more other elements or components as described in further detail below. In an embodiment, a magnetic field may be generated by first magnetic element 308 and can include a variable magnetic field. In embodiments, a variable magnetic field may be achieved by use of an inverter, a controller, or the like. In an embodiment, stator 304 may have an inner and outer cylindrical surface; a plurality of magnetic poles may extend outward from the outer cylindrical surface of the stator. In an embodiment, stator 304 may include an annular stator, wherein the stator is ring-shaped. In an embodiment, stator 304 is incorporated into a DC motor where stator 304 is fixed and functions to supply the magnetic fields where a corresponding rotor, as described in further detail below, rotates. In an embodiment, stator 304 may be incorporated an AC motor where stator 304 is fixed and functions to supply the magnetic fields by radio frequency electric currents through an electromagnet to a corresponding rotor, as described in further detail below, rotates.

Still referring to FIG. 3, assembly 100 may include propeller 116. In embodiments, assembly 100 may include an integrated rotor. As used herein, a rotor is a portion of an electric motor that rotates with respect to a stator of the electric motor, such as stator 304. A propeller, as used herein, is a component or device used to propel a craft by exerting force on a fluid medium, which may include a gaseous medium such as air or a liquid medium such as water. Propeller 116 may be any device or component that consumes electrical power on demand to propel an aircraft or other vehicle while on ground and/or in flight. Propeller 116 may include one or more propulsive devices. In an embodiment, propeller 116 may include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the motor to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propeller 116 may include at least a blade. Persons skilled in the art, upon reviewing the entirety of this disclosure, will be aware of various devices that may be used as propeller 116. In an embodiment, when a propulsor twists and pulls air behind it, it will, at the same time, push the aircraft forward with an equal amount of force. The more air pulled behind the aircraft, the more the aircraft is pushed forward.

Continuing to refer to FIG. 3, in an embodiment, propeller 116 may include hub 316 rotatably mounted to stator 304. Rotatably mounted, as described herein, is functionally secured in a manner to allow rotation. Hub 316 is a structure which allows for the mechanically coupling of components of the integrated rotor assembly. In an embodiment, hub 316 can be mechanically coupled to propellers or blades. In an embodiment, hub 316 may be cylindrical in shape, or include a cylindrical central cavity, such that it may be mechanically joined to other components of the motor. Hub 316 may be constructed of any suitable material or combination of materials, including without limitation metal such as aluminum, titanium, steel, or the like, polymer materials or composites, fiberglass, carbon fiber, wood, or any other suitable material. Hub 316 may move in a rotational manner driven by interaction between stator and components in the rotor assembly. Persons skilled in the art, upon reviewing the entirety of this disclosure, will be aware of various structures that may be used as or included as hub 316, as used and described herein.

Still referring to FIG. 3, in an embodiment, teetering propulsor assembly 100 and/or rotor shaft 336 may include a second magnetic element 320, which may include one or more further magnetic elements. Second magnetic element 320 generates a magnetic field designed to interact with first magnetic element 308. Second magnetic element 320 may be designed with a material such that the magnetic poles of at least a second magnetic element are oriented in an opposite direction from first magnetic element 308. In an embodiment, second magnetic element 320 may be affixed to hub 316, rotor shaft 336, or another rotating or stationary electric motor component disclosed herein. Affixed, as described herein, is the attachment, fastening, connection, and the like, of one component to another component. For example, and without limitation, affixed may include bonding the second magnetic element 320 to hub 316, such as through hardware assembly, spot welding, riveting, brazing, soldering, glue, and the like. Second magnetic element 320 may include any magnetic element suitable for use as first magnetic element 308. For instance, and without limitation, second magnetic element may include a permanent magnet and/or an electromagnet. Second magnetic element 320 may include magnetic poles oriented in a second direction opposite, in whole or in part, of the orientation of the poles of first magnetic element 308. In an embodiment, assembly 100 may include a motor assembly incorporating stator 304 with a first magnet element and second magnetic element 320. First magnetic element 308 may include magnetic poles oriented in a first direction, a second magnetic element includes a plurality of magnetic poles oriented in the opposite direction than the plurality of magnetic poles in the first magnetic element 308.

Referring again to FIG. 3, in an embodiment, first magnetic element 308 may be a productive element, defined herein as an element that produces a varying magnetic field. Productive elements may produce magnetic field that may attract and other magnetic elements, possibly including a receptive element. Second magnetic element may be a productive or receptive element. A receptive element may react due to the magnetic field of first magnetic element 308. In an embodiment, first magnetic element 308 may produce a magnetic field according to magnetic poles of first magnetic element 308 oriented in a first direction. Second magnetic element 320 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 316 and rotor assembly may both be cylindrical in shape where rotor may have a slightly smaller circumference than hub 316 to allow the joining of both structures. Coupling of hub 316 to stator 304 may be accomplished via a surface modification of either hub 316, stator 304 or both to form a locking mechanism. Coupling may be accomplished using additional nuts, bolts, and/or other fastening apparatuses. In an embodiment, an integrated rotor assembly as described above may reduce profile drag in forward flight for an electric aircraft. Profile drag may be caused by a number of external forces that the aircraft is subjected to. In an embodiment, incorporating propulsor 116 into hub 316, may reduce a profile of assembly 100 resulting in a reduced profile drag. In an embodiment, the rotor, which may include motor inner magnet carrier 324, motor outer magnet carrier 328, propulsor 116 may be incorporated into hub 316. In an embodiment, inner motor magnet carrier 324 may rotate in response to a magnetic field. The rotation may cause hub 316 to rotate. This unit may be inserted into assembly 100 as one unit. This may enable ease of installation, maintenance, and removal.

Still referring to FIG. 3, stator 304 may include through-hole 332. Through-hole 332 may provide an opening for a component to be inserted through to aid in attaching propeller with integrated rotor and rotor shaft to stator. In an embodiment, through-hole 332 may have a round or cylindrical shape and be located at a rotational axis of stator 304, which in an embodiment may be similar to or the same as axis of rotation 312. Hub 316 may be mounted to stator 304 by means of rotor shaft 336 rotatably inserted though through-hole 332. The rotor shaft 336 may be mechanically coupled to stator 304 such that rotor shaft 336 is free to rotate about its centerline axis, which may be effectively parallel and coincident to stator's centerline axis, and further the rotor shaft and stator may include a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 332 may have a diameter that is slightly larger than a diameter of rotor shaft 336 to allow rotor shaft 336 to fit through through-hole 332 to connect stator 304 to hub 316. Rotor shaft 336 may rotate in response to rotation of propulsor 116.

Still referring to FIG. 3, assembly 100 may include a bearing cartridge 340. Bearing cartridge 340 may include a bore. Rotor shaft 336 may be inserted through the bore of bearing cartridge 340. Bearing cartridge 340 may be attached to a structural element of a vehicle. Bearing cartridge 340 functions to support the rotor and to transfer the loads from the motor. Loads may include, without limitation, weight, power, magnetic pull, pitch errors, out of balance situations, and the like. Bearing cartridge 340 may include a bore. Bearing cartridge 340 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. Bearing cartridge 340 may be subject to a load which may include, without limitation, a radial or a thrust load. Depending on the location of bearing cartridge 340 in the assembly, it may see all of a radial or thrust load or a combination of both. In an embodiment, bearing cartridge 340 may join assembly 100 to a structure feature. Bearing cartridge 340 may function to minimize the structural impact from the transfer of bearing loads during flight and/or to increase energy efficiency and power of propulsor. Bearing cartridge 340 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 340 may act to keep propulsor 116 and components intact during flight by allowing assembly 100 to rotate freely while resisting loads such as an axial force. In an embodiment, bearing cartridge 340 may include a roller bearing incorporated into the bore. a roller bearing is in contact with rotor shaft 336. Stator 304 may be mechanically coupled to inverter housing. Mechanically coupled may include a mechanical fastening, without limitation, such as nuts, bolts or other fastening device. Mechanically coupled may include welding or casting or the like. Inverter housing may contain a bore which allows insertion by rotor shaft 336 into bearing cartridge 340.

Still referring to FIG. 3, assembly 100 may include a motor and/or motor assembly incorporating a rotating assembly and a stationary assembly. Hub 316, motor inner magnet carrier 324, and rotor shaft 336 may be incorporated into the rotor assembly of assembly 100 which make up rotating parts of electric motor, moving between the stator poles and transmitting the motor power. As one integrated part, the rotor assembly may be inserted and removed in one piece. Stator 304 may be incorporated into the stationary part of the motor assembly. Stator and rotor may combine to form an electric motor. In embodiment, an electric motor may, for instance, incorporate coils of wire, which may be similar to or the same as any of the electrically conductive components in the entirety of this disclosure, which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, first magnetic element 308 in assembly 100 may include an active magnet. For instance, and without limitation, a second magnetic element may include a passive magnet, a magnet that reacts to a magnetic force generated by first magnetic element 308. In an embodiment, a first magnet positioned around the rotor assembly, may generate magnetic fields to affect the position of the rotor relative to the stator 304. A controller may have an ability to adjust electricity originating from a power supply and, thereby, the magnetic forces generated, to ensure stable rotation of the rotor, independent of the forces induced by the machinery process.

Assembly 100 may include impeller 344, coupled with the rotor shaft 336. An impeller, as described herein, is a rotor used to increase or decrease the pressure and flow of a fluid, including at least air. Impeller 344 may function to provide cooling to assembly 100. Impeller 344 may include varying blade configurations, such as radial blades, non-radial blades, semi-circular blades and airfoil blades. Impeller 344 may further include single and/or double-sided configurations. Impeller 344 is described in further detail below. Additionally, or alternatively, in a non-limiting illustrative example, rotor shaft 336 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. The cooling vanes may alternatively or additionally cool other components disclosed herein with the impeller. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. Cooling vanes may be consistent with those disclosed in U.S. patent application Ser. No. 16/910,255 entitled "Integrated Electric Propulsion Assembly" and incorporated herein by reference in its entirety.

Figure 4:
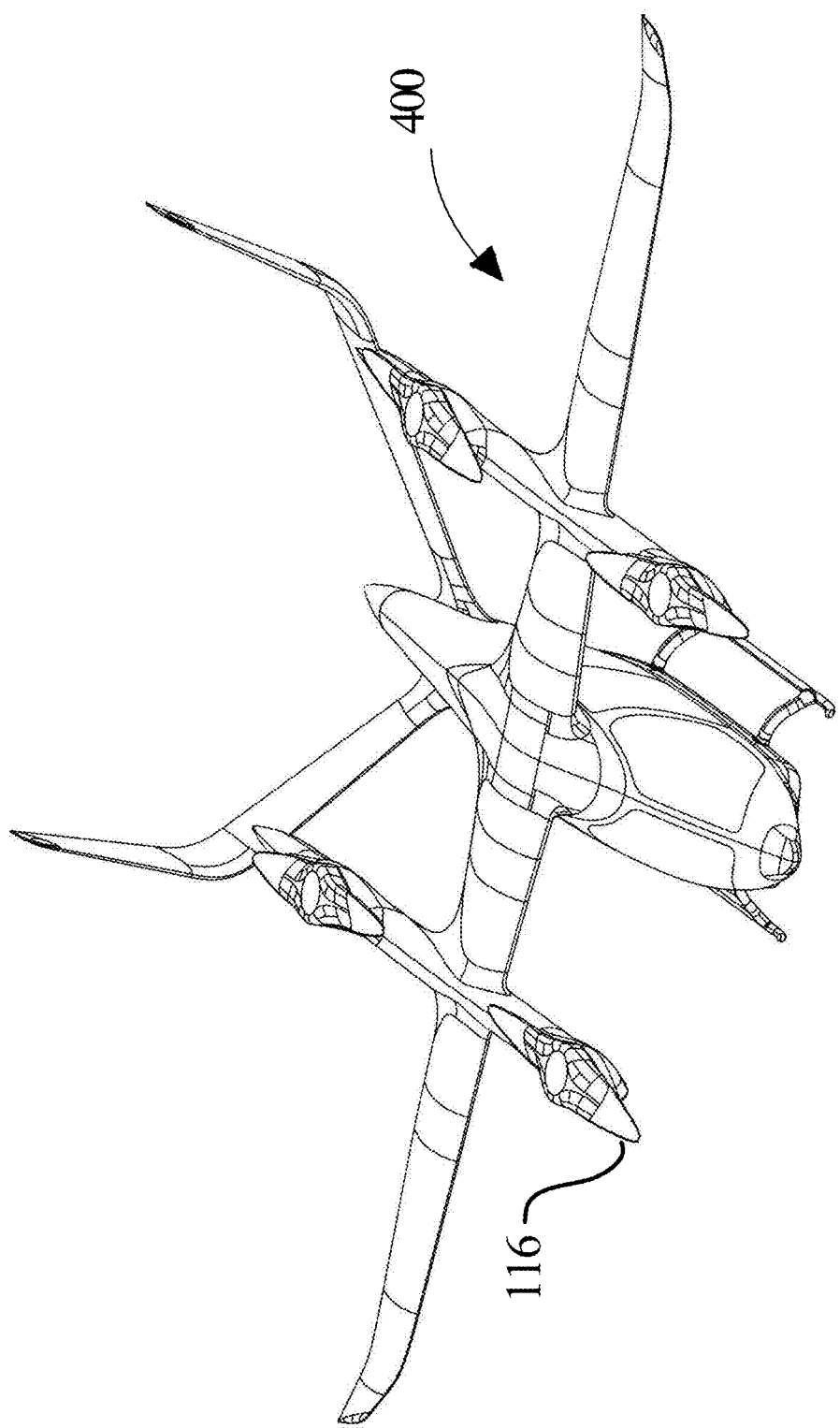
FIG. 4 is a perspective view of an exemplary electric aircraft in accordance with one or more embodiments of the present disclosure.

Now referring to FIG. 4, an exemplary embodiment of an electric aircraft 400 is illustrated. Electric aircraft 400 may include assembly 100, which may be mounted on a structural feature of an aircraft. Design of assembly 100 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of electric aircraft 400. For example, and without limitation structural feature may be any portion of a vehicle incorporating assembly 100, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 116. Persons skilled in the art, upon reviewing the entirety of this disclosure, will be aware of various materials, combinations of materials, and/or constructions techniques.

Still referring to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor 116 of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of electric aircraft 400, including without limitation propulsors and/or propulsion assemblies. In an embodiment, assembly 100 may eliminate need for many external structural features that otherwise might be needed to join one component to another component. Assembly 100 may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Still referring to FIG. 4, electric aircraft 400 can include assembly 100. Assembly 100 may include a stator which has a first magnetic generating element generating a first magnetic field. Assembly 100 may also include propulsor 116 with an integrated rotor assembly of the motor assembly which may include includes a hub mounted to stator, at least a second magnetic element generating a second magnetic field. First magnetic field and second magnetic field vary with respect to time which generates a magnetic force between both causing the rotor assembly to rotate with respect to the stator.

Still referring to FIG. 4, electric aircraft 400 may include an airframe 100, which is a mechanical structure of aircraft 400. Airframe may, in non-limiting embodiments, include a fuselage, undercarriage, empennage, wings, and/or landing gear. In one or more embodiments, airframe may include a structural element configured to provide support and shape to electric aircraft 400. The airframe structure may include one or more skid plates and/or landing gears. The airframe structure may include a truss, monocoque construction, semi-monocoque construction, and the like thereof. The airframe structure may include one or more metallic compounds such as aluminum, steel, titanium, composites, and the like thereof. In one or more embodiments, airframe may include a plurality of structural elements, such as a boom that at least partially enclosed a motor of a propulsor assembly. In other embodiments, airframe may include a plurality of airframes.

In one or more embodiments, a structural element of aircraft 400 may be composed of one or more one or more carbon fiber composite structures. A carbon fiber composite structure may be configured to include high stiffness, high tensile strength, low weight to strength ratio, high chemical resistance, high temperature tolerance, and low thermal expansion. In one or more embodiments, a carbon fiber composite may include one or more carbon fiber composite materials, including a plastic resin and/or graphite. For example, and without limitation, a carbon fiber composite material may be formed as a function of a binding carbon fiber to a thermoset resin, such as an epoxy, and/or a thermoplastic polymer, such as polyester, vinyl ester, nylon, and the like thereof.

As previously mentioned, electric aircraft 400 includes an electric vertical take-off and landing (eVTOL) aircraft. As used in this disclosure, an eVTOL is an aircraft that can hover, take off, and land vertically. An eVTOL, as used in this disclosure, is an electrically powered aircraft typically using an energy source, of a plurality of energy sources to power the aircraft. To optimize the power and energy necessary to propel aircraft, an eVTOL may be capable of rotor-based cruising flight, rotor-based takeoff, rotor-based landing, fixed-wing cruising flight, airplane-style takeoff, airplane style landing, and/or any combination thereof. Rotor-based flight, as described in this disclosure, is where aircraft generates lift and propulsion by way of one or more powered propellers coupled with an engine and/or motor. "Fixed-wing flight", as described in this disclosure, is where aircraft is capable of flight using wings and/or foils that generate lift caused by the aircraft's forward airspeed and the shape of the wings and/or foils, such as airplane-style flight.

In one or more embodiments, and as used in this disclosure, a "fuselage" is a main body of an aircraft. In one or more embodiments, fuselage may include the entirety of aircraft except for a cockpit, nose, wings, empennage, nacelles, flight components, such as any and all control surfaces and propulsors. Fuselage may contain a payload of aircraft. In one or more embodiments, airframe may form fuselage. For example, and without limitation, one or more structural elements of airframe may be used to form fuselage. For the purposes of this disclosure, "structural elements" include elements that physically support a shape and structure of an aircraft. Structural elements may take a plurality of forms, alone or in combination with other types. In one or more embodiments, a structural element may include a carbon fiber composite structure, as previously mentioned. The carbon fiber composite structure is configured to include high stiffness, high tensile strength, low weight to strength ratio, high chemical resistance, high temperature tolerance, and low thermal expansion. In one or more embodiments, a carbon fiber composite may include one or more carbon fiber structures comprising a plastic resin and/or graphite. For example, a carbon fiber composite may be formed as a function of a binding carbon fiber to a thermoset resin, such as an epoxy, and/or a thermoplastic polymer, such as polyester, vinyl ester, nylon, and the like thereof. Structural element may vary depending on a construction type of aircraft. For example, and without limitation, structural element may vary if forming the portion of aircraft that is fuselage. Fuselage may include a truss structure. A truss structure may be used with a lightweight aircraft and include welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may include steel tubes and/or wood beams.

In one or more embodiments, fuselage may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically connected to and spans a distance from station frame to station frame to create an internal skeleton on which to mechanically connect aircraft skin. A former (or station frame) may include a rigid structural element that is disposed along a length of an interior of aircraft fuselage orthogonal to a longitudinal (nose to tail) axis of aircraft and may form a general shape of fuselage. A former may include differing cross-sectional shapes at differing locations along fuselage, as the former is the structural element that informs the overall shape of a fuselage curvature. In embodiments, skin may be anchored to formers and strings such that an outer mold line (OML) of a volume encapsulated by formers and stringers comprises the same shape as aircraft when installed. In other words, former(s) may form a fuselage's ribs, and the stringers may form the interstitials between such ribs. The spiral orientation of stringers about formers may provide uniform robustness at any point on fuselage such that if a portion sustains damage, another portion may remain largely unaffected. Aircraft skin may be attached to underlying stringers and formers and may interact with a fluid, such as air, to generate lift and perform maneuvers.

In one or more embodiments, airframe may include various types of construction. For instance, and without limitation, airframe may include a monocoque construction, semi-monocoque construction, a truss with canvas construction, or a truss with corrugated plate construction. For example, and without limitation, fuselage may include and/or be constructed using monocoque construction. Monocoque construction may include a primary structure that forms a shell, such as skin, and supports physical loads. Monocoque fuselages are fuselages in which aircraft skin or shell is also the primary structure. In monocoque construction, aircraft skin may support tensile and compressive loads within itself and may, in some exemplary embodiments, be characterized by the absence of internal structural elements. Aircraft skin in this construction method is rigid and can sustain its shape with no structural assistance from underlying skeleton-like elements. In one or more non-limiting embodiments, a monocoque fuselage may include an aircraft skin made from plywood layered in varying grain directions, epoxy-impregnated fiberglass, carbon fiber, or any combination thereof.

In other embodiments, airframe may include a semi-monocoque construction. A semi-monocoque construction, as used in this disclosure, is a partial monocoque construction, where a monocoque construction is describe above detail. In a semi-monocoque construction, fuselage may derive some structural support from stressed skin and some structural support from an underlying frame structure made of structural elements. Formers or station frames can be seen running transverse to the long axis of fuselage with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically connected to formers permanently, such as with rivets. Skin may be mechanically connected to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. A unibody may be characterized by internal structural elements like formers and stringers being constructed in one piece, integral to aircraft skin as well as any floor construction like a deck.

In one or more embodiments, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their connection to aircraft skin, aerodynamic forces exerted on aircraft skin will be transferred to stringers. A location of stringers greatly informs the type of forces and loads applied to each and every stringer, all of which may be handled by material selection, cross-sectional area, and mechanical connecting methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In one or more embodiments, stressed skin, when used in semi-monocoque construction, is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of airframe, such as fuselage or wings. In some forms of monocoque construction, only structural skin, and in that sense, aircraft skin undergoes stress by applied aerodynamic fluids imparted by the fluid. Stress as used in continuum mechanics may be described in pound-force per square inch (lbf/in2) or Pascals (Pa). In semi-monocoque construction stressed skin may bear part of aerodynamic loads and additionally may impart force on an underlying structure of stringers and formers.

Aircraft 400 may include a plurality of laterally extending elements attached to fuselage. As used in this disclosure a "laterally extending element" is an element that projects essentially horizontally from a fuselage, including an outrigger, a spar, and/or a fixed wing that extends from fuselage. Wings may be structures which may include airfoils configured to create a pressure differential resulting in lift. Wings may generally be disposed on the left and right sides of aircraft symmetrically, at a point between a nose and empennage. Wings may include a plurality of geometries in planform view, swept swing, tapered, variable wing, triangular, oblong, elliptical, square, among others. A wing's cross section geometry may comprise an airfoil. For the purposes of this disclosure, an "airfoil" is a shape specifically designed such that a fluid flowing above and below it exert differing levels of pressure against the top and bottom surface. In one or more embodiments, a bottom surface of aircraft can be configured to generate a greater pressure than does the top of aircraft, resulting in lift. A laterally extending element may include differing and/or similar cross-sectional geometries over its cord length or the length from wing tip to where wing meets aircraft's body, or fuselage. One or more wings may be symmetrical about aircraft's longitudinal plane, which comprises the longitudinal or roll axis reaching down the center of the aircraft through the nose and empennage, and plane's yaw axis. Laterally extending element, such as wing, may include controls surfaces configured to be commanded by a pilot or pilots to change a wing's geometry and therefore its interaction with a fluid medium, like air. Control surfaces may include flaps, ailerons, tabs, spoilers, and slats, among others. The control surfaces may dispose on wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on the ground, such as taxing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
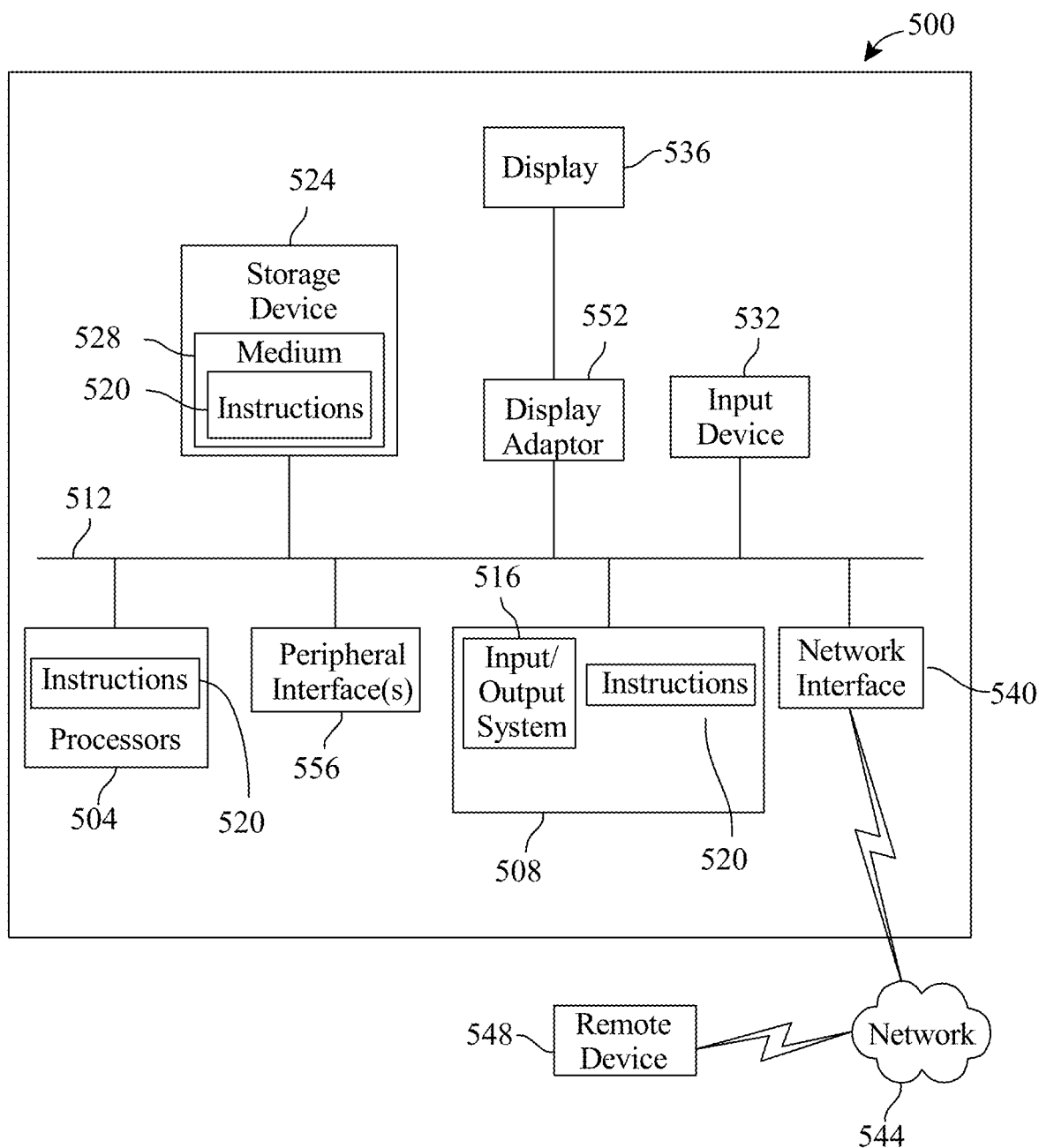
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric vertical takeoff and landing aircraft including a teetering propulsor assembly, the electric vertical takeoff and landing aircraft comprising:
    a motor;
    a propeller driven by the motor, wherein the propeller includes a hub;
    a teeter mechanism connected to the hub, the teeter mechanism comprising:
        a base rotatably affixed to the electric vertical takeoff and landing aircraft and configured to rotate about a rotational axis; and
        a hinge connecting the base and the propeller and configured to allow the propeller to pivot about a pivot point of the hinge, wherein the hinge is at least partially received in a recess of the hub, wherein a curved surface of the hinge forms a fulcrum against the recess.

2. The electric vertical takeoff and landing aircraft of claim 1, wherein the hinge comprises:
    an aperture; and
    a rod having a longitudinal axis, the rod traversing through the aperture of the hinge and a portion of the propeller to create the pivot point at the hinge between the base and the propeller allowing the propeller to pivot about the longitudinal axis of the rod.

3. The electric vertical takeoff and landing aircraft of claim 1, wherein the teeter mechanism comprises a plurality of springs configured to affect pivoting of the propeller.

4. The electric vertical takeoff and landing aircraft of claim 1, wherein the teeter mechanism comprises:
    a first rod that extends through a first aperture; and
    a second rod that extends through a second aperture.

5. The electric vertical takeoff and landing aircraft of claim 1, wherein the teeter mechanism further comprises a locking mechanism configured to prevent the propeller from teetering during flight.

6. The electric vertical takeoff and landing aircraft of claim 1, wherein the teeter mechanism is at least partially disposed within a cavity of the propeller.

7. The electric vertical takeoff and landing aircraft of claim 1, wherein the base is fixedly attached to a shaft of the motor.

8. The electric vertical takeoff and landing aircraft of claim 7, wherein the motor rotates at a speed equal to the propeller.

9. The electric vertical takeoff and landing aircraft of claim 1, further comprising:
    a second motor;
    a second propeller driven by the second motor;
    a second teeter mechanism connected to the second propeller, the second teeter mechanism comprising:
        a second base rotatably affixed to the electric vertical takeoff and landing aircraft and configured to rotate about a second rotational axis; and
        a second hinge connecting the second base and the second propeller and configured to allow the second propeller to pivot about a pivot point relative to the second base.

10. The electric vertical takeoff and landing aircraft of claim 1, wherein the teeter mechanism further comprises:
    a locking mechanism attached to the hub for selectively preventing the propeller from teetering, wherein the locking mechanism includes at least a spring attached to the hub; and
    an actuator in mechanical communication with the at least a spring and configured to vary a tensioning of the at least a spring for engaging and disengaging the locking mechanism.

11. The electric vertical takeoff and landing aircraft of claim 10, wherein the electric vertical takeoff and landing aircraft further comprises a controller communicatively connected to the actuator and configured to:
    adjust a position of the actuator to engage and disengage the locking mechanism; and
    alter a maximum rotational speed of the propeller at which the locking mechanism is engaged.

12. A teeter mechanism for a propulsor assembly of an electric vertical takeoff and landing aircraft, the mechanism comprising:
    a base mechanically connected to a propeller of an electric vertical takeoff and landing aircraft;
    a hinge extending from the base, the hinge comprising an aperture, wherein the hinge is at least partially received in a recess of a hub of the propeller, wherein a curved surface of the hinge forms a fulcrum against the recess; and
    a rod having a longitudinal axis, wherein the rod traverses through the aperture of the hinge and a portion of the propeller to create a pivot point at the hinge between the base and the propeller allowing propeller to pivot about the longitudinal axis of the rod so that a rotation plane of the propeller moves relative to the base.

13. The teeter mechanism of claim 12, further comprising a plurality of springs configured to affect pivoting of the propeller.

14. The teeter mechanism of claim 13, wherein the plurality of springs comprises a plurality of helical springs.

15. The teeter mechanism of claim 12, wherein the aperture comprises a first aperture and a second aperture, wherein the rod comprises:
    a first rod that extends through the first aperture; and
    a second rod that extends through the second aperture.

16. The teeter mechanism of claim 12, further comprising a locking mechanism configured to prevent the propeller from teetering during flight.

17. The teeter mechanism of claim 12, wherein the teeter mechanism is at least partially disposed within a cavity of the propeller.

18. The teeter mechanism of claim 12, wherein the base is fixedly attached to a shaft of a motor.

19. The teeter mechanism of claim 18, wherein the motor rotates at a speed equal to the propeller.

20. The teeter mechanism of claim 12, further comprising:
- a second teeter mechanism connected to a second propeller of the electric vertical take-off and landing aircraft, the second teeter mechanism comprising:
  - a second base rotatably affixed to the electric vertical takeoff and landing aircraft and configured to rotate about a second rotational axis; and
  - a second hinge connecting the second base and the second propeller and configured to allow the second propeller to pivot about a pivot point relative to the second base.

* * * * *